Nov. 6, 1928.

B. M. CHENEY

RAIL JOINT

Filed April 20, 1927

Inventor
Byron M. Cheney
George E. Mueller Atty.

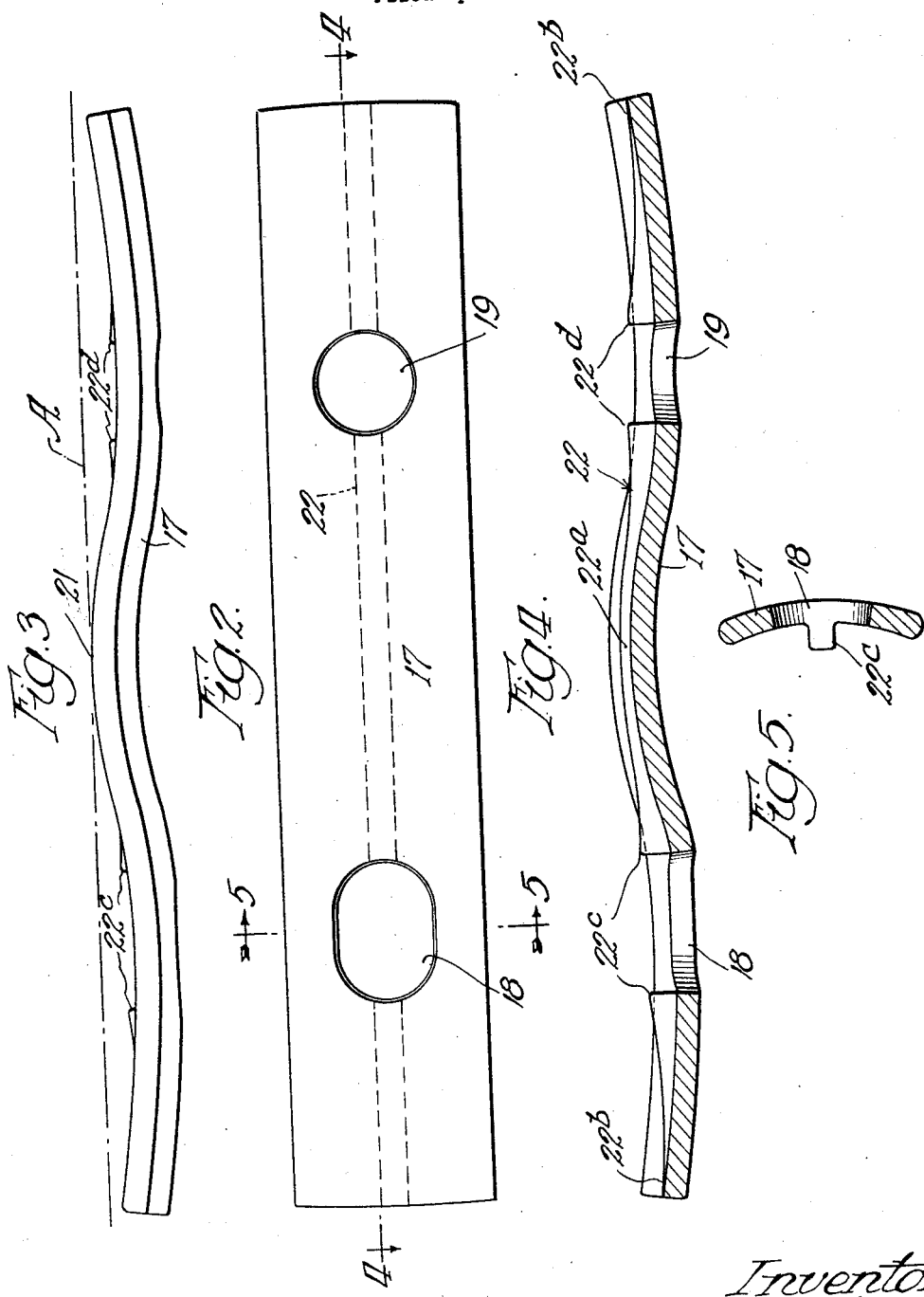

Patented Nov. 6, 1928.

1,690,885

UNITED STATES PATENT OFFICE.

BYRON M. CHENEY, OF CHICAGO, ILLINOIS.

RAIL JOINT.

Application filed April 20, 1927. Serial No. 185,097.

My invention relates to rail joints.

It relates more particularly to a rail joint spring of improved type adapted to be employed with a rail joint to secure certain advantages which will hereinafter appear.

The rail joint spring to which my invention is applied, is of general rectangular shape, normally curved out of a flat plane and having apertures for the reception of bolts, to secure the rail joint together. A rail joint spring of this general character has been known in the past, but it has been found objectionable at times because over-tightening of the bolts occasionally caused the spring to crack near the bolt apertures, and lose its efficacy, and the flattening of the spring due to the tightening of the bolts sometimes caused a side thrust to be applied to the bolt shank and this of course, lowered its effective strength, or bent the bolt.

An object of the present invention is to provide an improved rail joint.

Another object is to provide an improved rail joint spring.

Another object is to provide a rail joint spring, wherein the bolts may be tightened to secure the desired maximum spring tension on the joint and without in any way deleteriously affecting said spring.

Another object is to provide a rail joint spring which will permit a rail joint to be properly assembled by an unskilled workman.

The rail joint spring of my invention, is provided with means for preventing its being tensioned beyond the elastic limit of the material from which it is made. Specifically, I provide a raised spot in the vicinity of the bolt aperture to prevent too great flexing of the spring in the immediate vicinity of such aperture. If the spring is given a slightly different conformation than that which I show in the drawings, it is obvious that the means employed to effect my purpose may be slightly modified.

Other objects and features of the invention will become apparent from the consideration of the following detailed description taken with the accompanying drawings, wherein—

Fig. 2 is an enlarged plan view of one form of rail joint spring;

Fig. 3 is a side view thereof;

Fig. 4 is a sectional view along the line 4—4 of Fig. 2;

Fig. 5 is a sectional view along the line 5—5 of Fig. 2;

Figure 1:
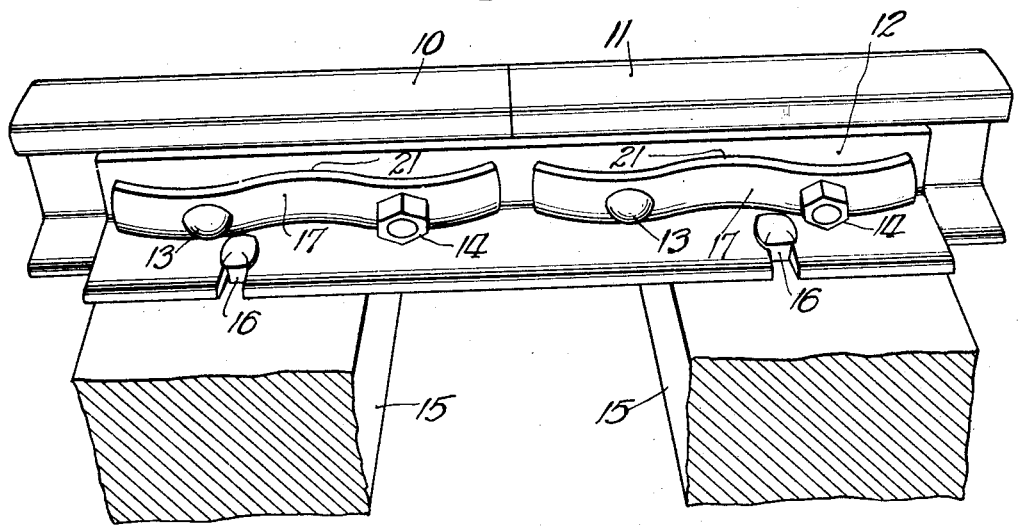
Fig. 1 is a perspective view of a rail joint embodying the features of my invention.

The spring may be employed with any usual form of a rail joint. In Fig. 1, I show my invention applied to a usual form of joint, wherein rail ends 10 and 11 are spanned by an angle bar 12 and bolts 13—13 and 14—14 are employed to secure the angle bar to the rails. Suitable means is of course provided at the opposite side of the rails to assist in supporting the same, but this portion of the joint is not shown in detail since it is not necessary to an understanding of the invention. The track is shown laid on the usual ties 15 and secured thereto by spikes 16.

The portion of the joint described in the preceding paragraph, is conventional. My joint however, differs from the conventional type, in the use, in combination therewith of a rail joint spring 17 adapted to keep the bolts 13 and 14 tight, to compensate for stretching of the bolts or the threads thereof, and to take up wear on the angle bar 12, or other type of "fish plate" which may be used.

A preferred form which the spring may take, is shown in Figs. 2 to 5 on Sheet 2, of the drawings. As illustrated, the spring is of general rectangular shape and provided with apertures 18 and 19 through which the shanks of the bolts 13 and 14 extend. The aperture 18 is of non-circular form, adapted to receive a similarly shaped portion adjacent the head of the bolt 13 to prevent the turning thereof. The bolts are inserted in opposite directions, so that one bolt is held by the spring, and the other by whatever member is placed on the opposite side of the rail. Aperture 19 therefore is round and adapted to receive the threaded end of the bolt shank.

The rail joint spring is normally curved so that when it is tensioned under the influence of the bolt, it tends to flatten and impart a constant and substantially uniform pressure to the angle bar 12 and to the bolt head and nut. It is curved in a single direction transversely, but longitudinally, it has a compound curve of triple continuing character, the mid-point having a reversed curvature bellying in a direction toward the angle-bar, with the end portions of the spring curving with the belly toward the bolt head. This compound curvature is illustrated particularly in Fig. 3.

The broken line A indicates the relative position of the various points on the spring. It will be observed by studying this figure, that a point 21 midway of the ends of the spring, is the center of the reversed curvature and projects sufficiently so that when the bolts are tightened, this point becomes the fulcrum about which the first deformation of the spring takes place. The ends of the spring then engage and the spring subsequently flattens out between the point 21 and the ends thereof. The transverse curvature of the spring results in the edges at the point 21 engaging first and the end corners of the spring engaging secondly. The resulting flattening action which takes place when the bolts are tightened, affects both the longitudinal curvature and the transverse curvature.

In order to avoid the possibility of a workman pulling a bolt up tightly enough to crack the spring across the narrow body of material close to the bolt apertures, a stop portion is provided adjacent these apertures. Such raised portions may be provided in any suitable manner and may have any contour which will effect the result desired.

In the preferred form, the material constituting the spring, is produced with a rib 22 running continuously along the under side thereof. When the spring is shaped to produce the necessary curvature, the rib 22 is partially flattened at the middle 22ª and at the ends 22ᵇ. This leaves raised portions 22ᶜ about the aperture 18 and raised portions 22ᵈ about the aperture 19. The specific manner in which this effect is produced is of no great importance. It is contemplated, for example, that the excess material at the points 22ª and 22ᵇ may, by the forming action, be partially forced toward the raised portions 22ᶜ and 22ᵈ, thus enlarging them.

With the raised portions or stops 22ᶜ and 22ᵈ adjacent the apertures, it is obvious that these points will strike the angle bar before the elastic limit of the material employed in the spring is reached. When these points are brought down against the angle bar, the effect is to prevent further flexing action, or bending of the spring. In other words, the spring has received its maximum possible tension when in this position.

The presence of these raised portions or stops will not in any way affect the normal operation of the spring. These points are below the point of engagement of the spring with the angle bar and the maximum of spring tension is built within the spring before the stops engage the angle bar. It is only at the point at which the spring is in danger of being over-tensioned, that these points engage and act as a safety device.

In order to prevent a creeping action of the spring, causing it to exert a side thrust on the bolt, the spring is symmetrically shaped on each side of the high or medial point 21. This means that the bolt apertures are located at substantially the mid-point of the portions of the spring on the sides of the point 21, and that the degree of curvature at each side of the bolt aperture is substantially the same.

Figure 6:
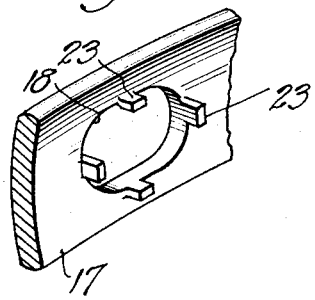
Fig. 6 is a fragmentary perspective view of a modified form of spring.

In the modified form of spring, a fragmentary view of which is shown in Fig. 6, separate stops 23 are located adjacent the edge of the bolt aperture. These stops do not constitute part of a rib or any continuous section of metal. The manner in which they are produced is not of prime importance, but I contemplate that they may be formed when the aperture 18 is blanked out. They may constitute part of the material removed from such aperture, in which case they would be in the form of tabs, bent from the plane of the spring onto the inner face thereof. Other ways in which these stops could be formed will readily suggest themselves to those skilled in the art.

Figure 7:
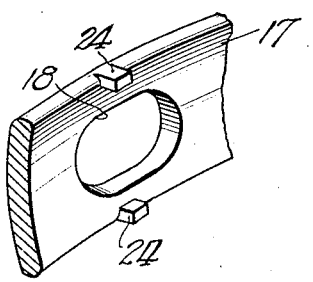
Fig. 7 shows still another modification.

Fig. 7 shows stops 24 along the edge of the spring in line with the bolt apertures. These stops are of sufficient size so that the bolt head or nut as the case may be, partially overlaps them. This is a rigid construction but substantially the same effect can be obtained with stops of considerably smaller size.

In the production of any form of stop, it is preferably arranged to prevent the tensioning of the material of the spring beyond the elastic limit thereof although this may be modified so as to still secure a desired holding tension. The location, size, or manner of providing the tension resisting means, may vary without in any way departing from the spirit and scope of the invention.

What I claim as new and desire to secure by United States Letters Patent is:—

1. A rail joint spring for application to a bolt secured rail joint, said spring comprising a section of sheet like spring material shaped to be tensioned by the bolts, and means for preventing the tensioning of such spring beyond the elastic limit thereof.

2. A rail joint spring for application to a bolt secured rail joint, said spring comprising a section of sheet like spring material shaped to be tensioned by the bolts securing the joint, and having a raised spot for engaging a portion of said joint to prevent said spring being tensioned beyond its elastic limit.

3. A rail joint spring as defined in claim 2 wherein said raised spot is formed of a ridge extending longitudinally of the spring, portions of the ridge being flattened to accentuate the unflattened portions thereof.

4. A rail joint spring comprising a section of curved spring bar material shaped to be flattened under bolt pressure, and having means for preventing said bolt pressure from stressing said spring beyond its elastic limit when being flattened in tightening the bolt.

5. A rail joint spring comprising spring material of general rectangular form, curved longitudinally and laterally with bolt receiving apertures therethrough, and means for preventing tensioning of the spring beyond the elastic limit thereof when applied to a rail joint.

6. A rail joint spring as defined in claim 5 wherein the means for preventing undue tensioning of the spring comprises an integral medial rib longitudinal thereof.

7. A rail joint spring having a transverse curvature and a triple continuing longitudinal curvature, provided with bolt receiving apertures and having a stress limiting stop adjacent said apertures.

8. A rail joint spring having a transverse curvature and a triple continuing longitudinal curvature provided with a point of reverse longitudinal curvature located at substantially the center of the spring and provided with bolt receiving apertures approximately midway between said point of reverse curvature and the ends of the spring, and stress limiting stops adjacent the apertures.

9. A rail joint spring for application to a bolt secured rail joint, said spring comprising a section of sheet like spring material shaped to be tensioned by the bolts securing the joint, and having a longitudinal rib shaped to prevent tensioning the spring beyond its elastic limit.

10. A rail joint spring for a bolt secured rail joint, said spring having a triple longitudinal curvature with a medial fulcrum of curvature, and being of symmetrical formation on each side of said medial point with centrally disposed bolt openings to prevent the application of a side thrust to the bolts.

11. In a rail joint a pair of rails having their ends abutting, an angle bar spanning the joint and engaging the two rails, bolts extending through the angle bar and through the rails to join the rail ends together, and a rail joint longitudinally and transversely curved spring having apertures for receiving the bolts, one of said apertures being out of round to engage a correspondingly shaped portion on the shank of the bolt near the head thereof to prevent turning of said bolt, and means to prevent applying the spring beyond its elastic limit.

12. A joint as defined in claim 11 with the spring having a single lateral curve and a compound longitudinal curve, with the bolt apertures located longitudinally midway between the medial line of longitudinal curvature and the end of spring.

13. A rail joint spring for application to a bolt-secured rail joint, said spring being provided with a longitudinal rib along its under side and having an outline of general longitudinal character, with a longitudinal curvature causing a tensioning of the spring when the bolts are tightened, bolt holes being provided one at each side of the center thereof.

14. A rail joint spring for application to a bolt-secured rail joint, said spring comprising a section of spring material of general rectangular outline and designed to be tensioned by the bolts securing the joint, and having a longitudinal rib adapted to prevent cracking of the spring when the securing bolts are placed under tension.

In witness whereof, I hereunto subscribe my name this 14th day of April, 1927.

BYRON M. CHENEY.